United States Patent Office.

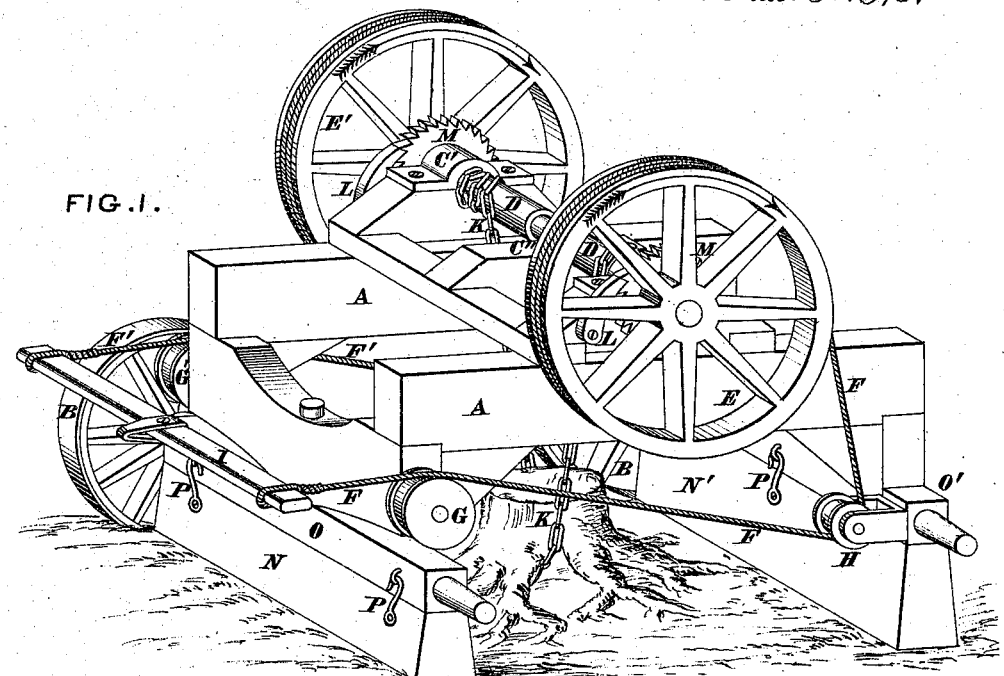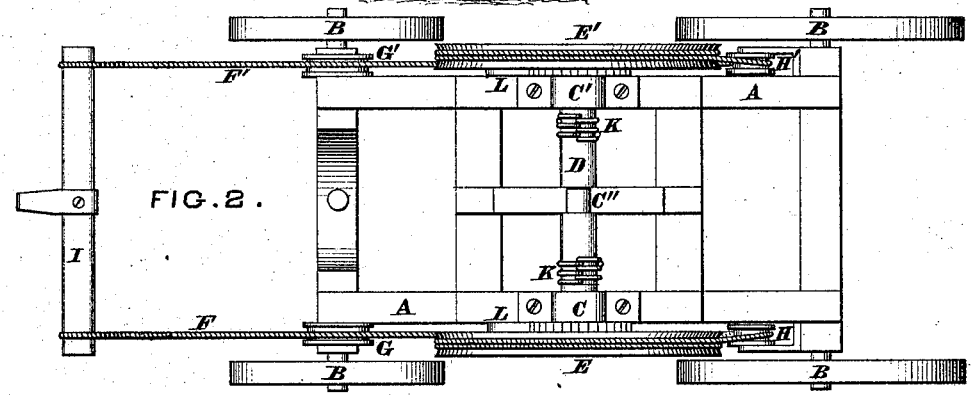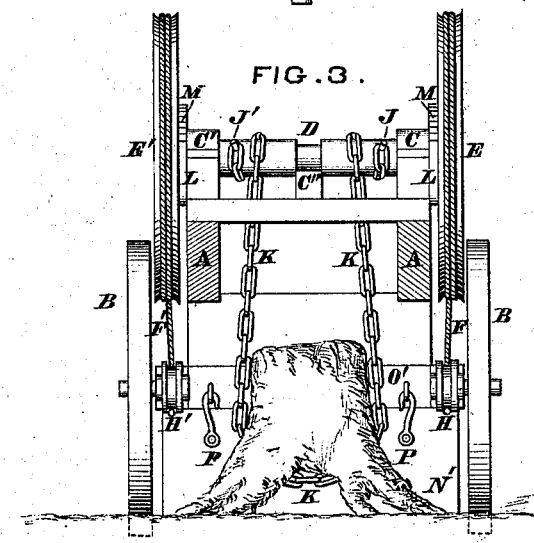

HENRY SCHWARTZ, OF FAYETTEVILLE, OHIO.

Letters Patent No. 100,674, dated March 8, 1870.

IMPROVEMENT IN STUMP-EXTRACTORS.

The Schedule referred to in these Letters Patent and making part of the same

I, HENRY SCHWARTZ, of Fayetteville, Brown county, Ohio, have invented a new and useful Stump-Extractor, of which the following is a specification.

Nature and Objects of the Invention.

My invention relates to a compact and effective device propelled by animal power for the dislodgement and elevation of stumps of trees and other obstructions, and their removal to gulleys or other places deposit.

General Description with Reference to the Drawings.

Figure 1 is a perspective view of the machine, lacking two of the ground-wheels.

Figures 2 and 3 are respectively a plan and a transverse section of the machine.

A is a frame mounted upon four ground-wheels, B, and provided at top with journal-bearings C C' and a central support, C'', for a windlass-shaft, D, whose extremities project beyond the frame A and are provided with two large pulleys, E E', to whose peripheries are attached the ends of two ropes, F F', whose other extremities, being conducted around sheaves or pulleys G G' H H', are made fast to a whiffletree, I, to which the team is hitched.

The portion of the shaft D within the frame is provided with pins or spurs J J' for the engagement of the ends of a chain, K, whose light or middle portion is engaged under one of the principal roots of the stump, as seen in figs. 1 and 3.

Pawls L engaging in ratchets M prevent retrograde action while at work.

Chocks N N' secured to the under side of the axles O O' by hooks P take the downward stress of the machine while at work, so as to relieve the ground-wheels of all duty save that of supporting the unloaded machine.

Operation.

The machine having been drawn to its desired position over the stump and the axles chocked, the pawls are removed from the ratchets, and the team, being hitched to the bight of the chain, the rope and chain are unwound from the windlass. The chain is then engaged around a root or other projection of the stump, and the team hitched to the whiffletree. The pawls are then returned to their ratchets, and the team, being driven from the stump, acts, through the purchase due to the preponderating diameter of the pulleys over the shaft, to draw the stump from its anchorage in the ground.

The stump having been thus loosened and elevated, the axles are unchocked, and the machine, with the stump still suspended, may now be drawn by the same team to a gulley or other spot at which it may be desired to deposit the stump.

Claim.

I claim herein as my invention—

The arrangement of frame A, ground-wheels B, windlass D E E', ratchets L M', and chocks N N', with their described or equivalent accessories for the purpose stated.

In testimony of which invention I hereunto set my hand.

HENRY SCHWARTZ.

Witnesses:
 GEO. H. KNIGHT,
 JAMES H. LAYMAN.